United States Patent [19]
Breitfuss

[11] 3,789,886
[45] Feb. 5, 1974

[54] LINED CONDUIT

[75] Inventor: Thomas K. Breitfuss, Tustin, Calif.

[73] Assignee: Hydro Conduit Corporation, Newport Beach, Calif.

[22] Filed: July 27, 1972

[21] Appl. No.: 275,793

[52] U.S. Cl. .................................. 138/146, 138/147
[51] Int. Cl. ............................................. F16l 9/14
[58] Field of Search ....... 138/146, 145, 97, 98, 147; 285/55

[56] References Cited
UNITED STATES PATENTS

| | | | |
|---|---|---|---|
| 2,243,273 | 5/1941 | Edwards | 138/147 |
| 2,977,994 | 4/1961 | Xenis | 138/97 |
| 2,416,618 | 2/1947 | Ferla | 285/55 |

Primary Examiner—George E. Lowrance
Assistant Examiner—Steven Pollard
Attorney, Agent, or Firm—Carpenter, Ostis and Lindberg

[57] ABSTRACT

A closed conduit has a liner for the crown thereof, the conduit being ordinarily subject to flow in the invert portions thereof of a liquid bearing a corrosive vapor or a vapor which is converted to a corrosive liquid. The liner is formed from a rectangular essentially planar corrosion resistant sheet of deformable material having memory characteristics causing the material to tend to revert to its undeformed condition. The sheet is deformed and constrained to define a tube having a diameter less than the diameter of the conduit, and is inserted into the conduit. Structure is disposed within the conduit adjacent at least to one side of the flow line thereof to engage the longitudinal edge of the sheet and restrain the edge in position upon release of the constraint of the sheet, so that when the sheet returns to its undeformed state to line the crown of the conduit, the corrosive action of the vapor is not manifest against the crown portions of the conduit.

6 Claims, 11 Drawing Figures

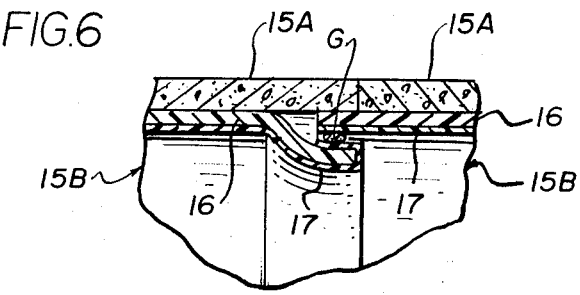
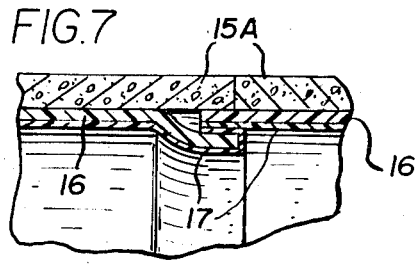
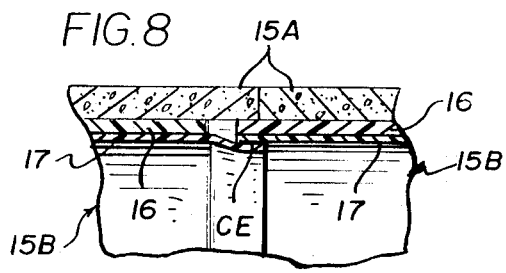
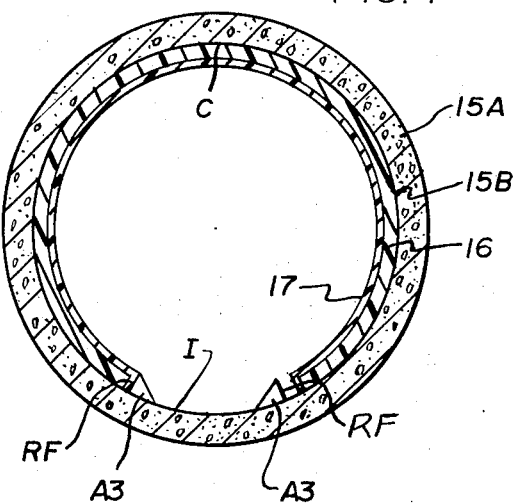
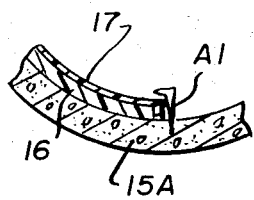
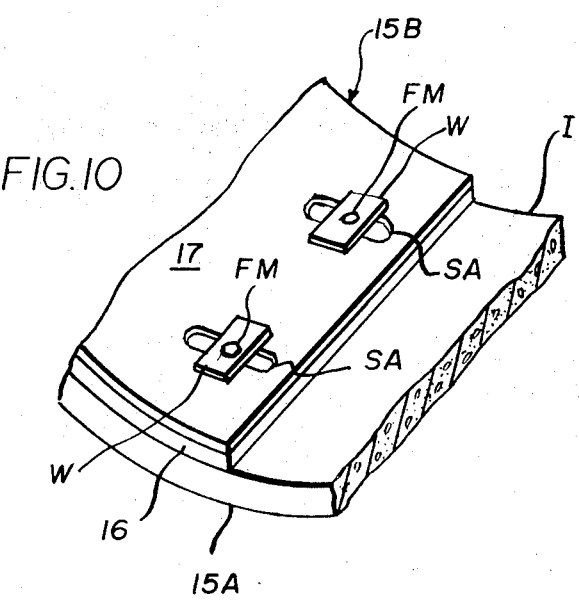
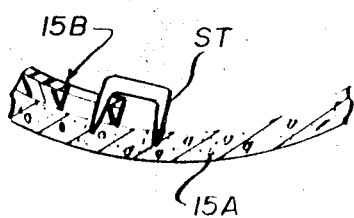

LINED CONDUIT

BACKGROUND OF THE INVENTION

1. Field of the Invention

The structure according to the present invention relates generally to liners for concrete pipes or the like to prevent the action of corrosive liquid or vapors on the material thereof.

2. The Prior Art

The prior art appears to be best exemplified in the following patents:

| Xenis | 2,977,994 | April 4, 1961 | 138/97 |
|---|---|---|---|
| Goffin et al. | 3,251,720 | May 17, 1966 | 156/73 |
| Peters | 3,349,852 | Oct. 31, 1967 | 166/113 |
| Rubenstein | 3,424,203 | Jan. 28, 1969 | 138/98 |

Of particular interest is Xenis U.S. Pat. No. 2,977,994 which shows a device for repairing cracks in a closed conduit. The structure shown therein comprises a flexible endless steel band having a flexible layer integral therewith, the steel band and the flexible material being constrained for entrance into a pipe preparatory to release of the constraint whereby the flexible material will bear against the crack and close the leak. The band shown in Xenis is made of spring steel and is obviously subject to the action of any corrosive liquids within the repaired pipe, and upon complete corrosion of the band, the flexible material sealing the break would likely detach itself from the bore of the pipe. Moreover, the flexible material has little resistance to bursting pressures within the pipe, since it has no particular structural qualities.

SUMMARY OF THE INVENTION

The liner disclosed herein presents a number of advantages not taught in the prior art patents. According to the invention, crown portions of the pipe are covered by the liner so that they are protected against corrosive vapors borne by the liquid at the invert of the pipe or corrosive liquid formed in the crown thereof. Moreover, by reason of the structure shown, the inherent property of the liner material to return to its undeformed state after being constrained for placement within the pipe enables there being some minor variations in the dimensions of the undeformed sheet, all the while the crown portions are being protected. According to the invention, the sheet to be deformed and to line the crown portions of the pipe may be formed of two or more materials, one of such may be a layer having the inherent memory properties causing the same to tend to return to its undeformed condition, the other being a layer of material of particular resistance to the corrosive vapors borne in the stream at the invert.

Alternately, the liner may be made of a single layer of material having both memory characteristics and resistance to corrosion and penetration of vapor.

The structure disclosed herein is particularly adapted to concrete sanitary sewer pipe where the liquid bears hydrogen sulfide, and the action of anaerobic bacteria thereon in the liquid and the vapor gives rise to the formation of sulfuric acid, a most corrosive substance.

THE DRAWINGS

FIG. 4 is a transverse cross-sectional view showing an alternate form of abutment adjacent the invert of the pipe for restraining the edge of the deformed sheet of FIG. 2 in position;

FIG. 6 is a view similar to FIG. 5, to a different scale, of an alternate structure for effecting a seal between adjacent liners;

FIGS. 7 and 8 show alternate structures for effecting a seal between the adjacent liners;

FIGS. 9, 10 and 11 show different embodiments of abutment structures for restraining the edges of a liner adjacent the invert of the pipe.

The structure according to the present invention is embodied in the environment of a closed conduit 15 for a fluid such as a liquid containing a vaporizable material which is itself corrosive or which may be converted to a corrosive liquid. The conduit shown is in the form of a cylindrical pipe 15A, having a crown C and an invert I. Pipe 15A is lined with an essentially planar corrosion resistant sheet 15B having a corrosion resistant liner ply 17 formed integrally with a ply of sheet material 16 having memory characteristics. There are a number of resinous materials having memory characteristics, well known in the art, nylon, polyolefines being examples of such resins.

Figure 3:
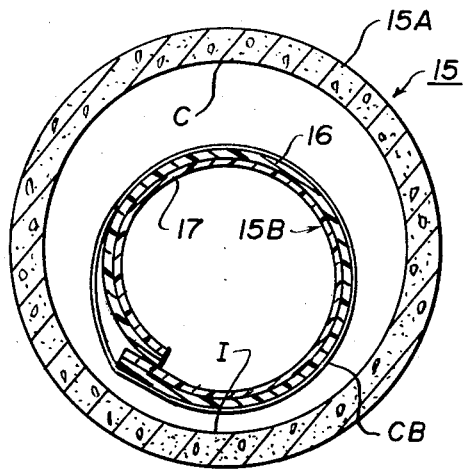
FIG. 3 is a view similar to FIG. 1 showing the sheet of FIG. 2 deformed and covered to define a tube adapted to enter the conduit seen in FIGS. 1 and 2.
Figure 2:
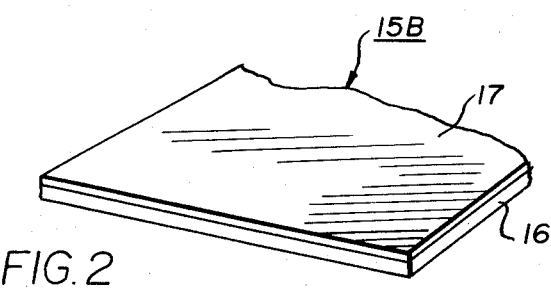
FIG. 2 is a fragmentary isometric view of a deformable sheet adapted to line the crown portions of the pipe seen in FIG. 1.

Sheet 15B of FIG. 2 is placed within the concrete pipe 15A by first convolutely winding same and constraining the tube thus formed by means of one or more constraining bands CB. Ply 16, being made of deformable material having memory characteristics, tends to revert to its undeformed condition. When the constraining bands CB are removed from around the tube seen in FIG. 3, such tendency of the material causes it to unwrap from the convoluted condition thereof to engage firmly the crown portions of pipe 15A, leaving the invert I uncovered.

Figure 1:
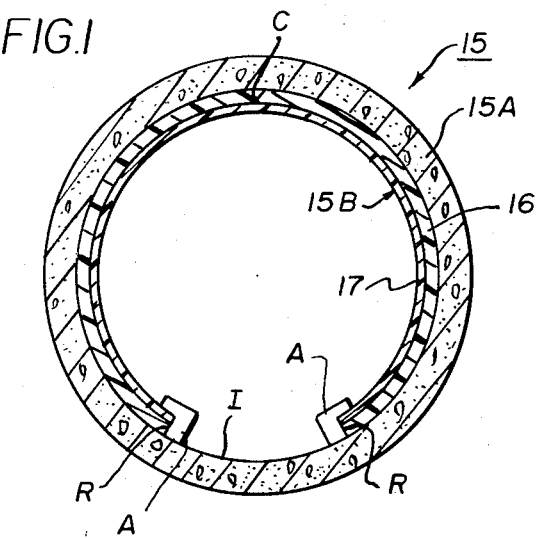
FIG. 1 is a transverse section through a closed conduit such as a concrete pipe or the like, showing the placement of the liner according to the present invention therein.

Structure is provided and is disposed at least to one side of the invert I of the pipe 15A for engaging a longitudinal edge of the rectangular sheet 15B seen in FIG. 2 and restraining same in position upon release of the constraint described. As seen in FIG. 1, an abutment A is positioned in pipe 15A at least to one side of the invert I. Abutment A has a recess R for engaging such edge of the sheet 15B. If desired, at an appropriate distance to the other side of the invert I, a similar abutment A may be placed within pipe 15A, it also having a recess R for engaging the opposite edge of the sheet 15B.

The abutments A seen in FIG. 1 are preferably formed from a material especially resistant to corrosive elements carried by a stream flowing at the invert I, and the abutments A may be placed in proper position by any suitable means, details of each securing means being described hereinafter, or as known to one skilled in the art. It may be noted that the abutments A can be spaced at convenient distances throughout the length of the pipe section 15A.

The nature of the material 16 is such that in attempting to revert to the undeformed condition thereof after release of the constraint by the constraining bands CB, the material will at all times tend to press against the inner surface of the pipe 15.

Figure 5:
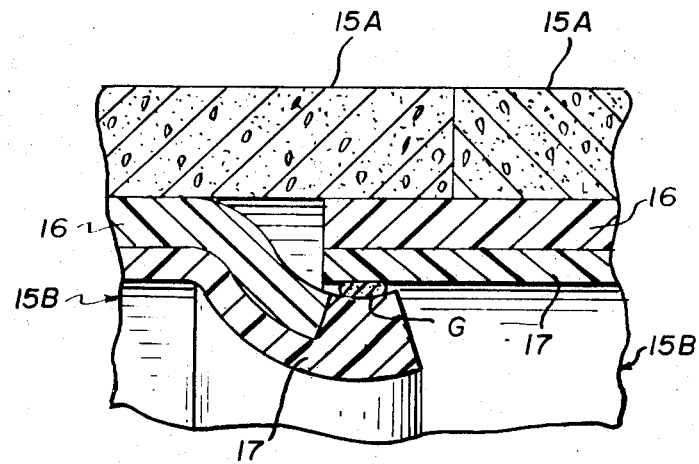
FIG. 5 is a longitudinal fragmentary section showing a pair of pipes in abutting end-to-end relationship, with structure for effecting a seal between adjacent liners of the pipes.

Structure is provided for sealing one end of a newly placed sheet against the other end of the previously placed adjacent sheet. The downstream end of a liner 15B is accordingly placed against the upstream end of the downstream liner 15B already placed within a pipe 15A. As seen in FIG. 5 particularly, the downstream end of an upstream liner 15B is provided with sealant gasket material G which bears against the upstream end of an already placed liner downstream thereof.

As best seen in FIG. 5, at the downstream end thereof the corrosive resistant ply 17 of the liner may be enlarged or be provided with a greater thickness so as to form a notch and abutment for receiving the downstream edge of the other ply 16 of the liner to prevent any possible shifting of one ply with respect to the other ply of the liner.

In FIG. 6 there is shown another form of seal between two liners 15B, the downstream end of the upstream liner having the corrosive resistant ply 17 turned back against itself against ply 16, the sealant G being placed between the correlative upstream and downstream ends of the adjacent liners 15B.

In FIG. 7 there is shown a form similar to FIG. 6 wherein the sealant G is omitted.

FIG. 8 is a view similar to FIG. 6 in which the corrosive resistant ply 17 extends beyond the downstream end of the upstream liner 15B and is cemented at CE to the upstream end of the already placed liner.

In any of the examples according to FIGS. 5, 6 and 7, the material of the liner 15B is such that in recovering by reason of its memory characteristics, it will distort so that the downstream end of the liner will be in lapping relationship of the upstream end of the adjacent liner 15B.

As seen in FIG. 4, the abutments for the edges of the liner 15B are denoted by the reference character A3, each of the abutments A3 having a radial face RF against which the longitudinally extending edges of the liner 15 abut. Sufficient clearance is provided between one longitudinal edge of the liner 15B and one of the abutments A3 to compensate for differences in dimension such as in occasioned by temperature changes.

In FIG. 9 there is shown a form of abutment A1 in the form of a case-hardened spike which can be driven into the concrete by any suitable percussive tool.

FIG. 10 shows another form of abutment for the restraint of the liner 15B adjacent the invert I of pipe 15A, liner 15B having a slotted aperture SA therein extending at regular intervals throughout the length thereof. A fastening member FM extends through a washer W bearing against liner 15B and through slot SA and is secured to the concrete in any suitable well-known fashion. The provision of the slots SA provide for changes in dimension of the liner 15A which may be occasioned by changes in temperature.

FIG. 11 shows a structure somewhat similar to FIG. 10, the liner 15B being secured in position at the slots SA by means of a staple ST made of case-hardened material and secured to the concrete pipe 15A by any suitable percussive tool. It may be noted that the fastening members FM, ST, and A may be of a material particularly resistant to corrosion such as certain chromium-bearing steels.

It is important to note that the liner is of sufficient structural stability that it will remain as a tube despite external hydrostatic pressure from groundwater infiltration. Since the liner does not cover the invert I, the groundwater infiltrating may be relieved at the edges of the liner adjacent the invert I.

I claim:

1. In combination, a concrete pipe or the like, which is subject to the flow of liquid bearing corrosive elements such as corrosive liquids and vapors, and a liner for the crown of said pipe, comprising:

a. a liner formed from a rectangular, essentially planar, inherently stiff, corrosive resistant sheet of deformable plastic material having memory characteristics causing the sheet to tend to revert to undeformed condition, after first being deformed and constrained to define a tube having a diameter less than the diameter of said pipe for initial insertion into said pipe;

b. said pipe including retaining means disposed to at least one side of the invert of said pipe for engaging a longitudinal edge of said sheet and retaining said edge in position after release of constraint of said sheet, so that said sheet snugly engages and lines the upper portions of said pipe to form a protective barrier between said corrosive elements and said upper portions of said pipe;

c. said sheet being disposed to snugly engage the inner surface of said pipe but being free from any bonding attachment thereto.

2. A liner according to claim 1 wherein said sheet is formed of two plies, one of said plies having said memory characteristics and the other ply being especially resistant to corrosion.

3. A liner according to claim 1 wherein means are provided to effect a seal between adjacent sheets of said liner by lapping an offset edge of one liner over the edge of an adjacent liner.

4. A liner according to claim 3 wherein resilient material is used between overlapping sheets to effect the seal.

5. A liner according to claim 3 wherein said seal is adhered to said liners.

6. A liner according to claim 2, wherein one of the plies of said sheet presents at one end thereof abutment means for engaging and retaining the corresponding end of the other of said plies.

* * * * *